United States Patent
Gueron (10) Patent No.: US 9,559,848 B2
(45) Date of Patent: Jan. 31, 2017

(54) METHOD, APPARATUS, AND INSTRUCTIONS FOR SAFELY STORING SECRETS IN SYSTEM MEMORY

(71) Applicant: Shay Gueron, Haifa (IL)

(72) Inventor: Shay Gueron, Haifa (IL)

(73) Assignee: INTEL CORPORATION, Santa Clara, CA (US)

(*) Notice: Subject to any disclaimer, the term of this patent is extended or adjusted under 35 U.S.C. 154(b) by 110 days.

(21) Appl. No.: 14/467,425

(22) Filed: Aug. 25, 2014

(65) Prior Publication Data

US 2016/0056961 A1    Feb. 25, 2016

(51) Int. Cl.
*H04L 9/32* (2006.01)
*H04L 9/08* (2006.01)

(52) U.S. Cl.
CPC ........... *H04L 9/3226* (2013.01); *H04L 9/0894* (2013.01)

(58) Field of Classification Search
CPC .......... G06F 21/31; G06F 21/36; G06F 21/46; G06F 21/83; H04L 63/083; H04L 9/3226
USPC ........................................................ 713/183
See application file for complete search history.

(56) References Cited

U.S. PATENT DOCUMENTS

| | | | | |
|---|---|---|---|---|
| 6,725,382 B1* | 4/2004 | Thompson | ............... | G06F 21/34 340/5.54 |
| 2007/0239988 A1* | 10/2007 | Atzmony | ................ | G06F 21/78 713/183 |
| 2013/0086377 A1* | 4/2013 | Cilfone | ................... | H04L 9/085 713/156 |
| 2014/0108811 A1* | 4/2014 | Kanungo | ............ | H04L 63/0442 713/183 |
| 2014/0237566 A1* | 8/2014 | Enache | ................. | H04L 9/3226 726/6 |

* cited by examiner

*Primary Examiner* — Baotran N To
(74) *Attorney, Agent, or Firm* — Nicholson De Vos Webster & Elliott LLP

(57) ABSTRACT

Embodiments of an invention for method, apparatus, and instructions for safely storing secrets in system memory are disclosed. In one embodiment, a processor includes a hardware key, an instruction unit, and an encryption unit. The instruction unit is to receive an encryption instruction and a compare instruction. The encryption instruction is to have a first plaintext input value. The compare instruction is to have a second plaintext input value. The encryption unit is to, in response to the encryption instruction, encrypt the first plaintext input value using the hardware key to generate a ciphertext value, and, in response to the compare instruction, decrypt the ciphertext value using the hardware key to generate a plaintext output value and compare the plaintext output value to the second plaintext input value.

19 Claims, 5 Drawing Sheets

FIGURE 3

FIGURE 4
METHOD 400

FIGURE 5
METHOD 500

METHOD, APPARATUS, AND INSTRUCTIONS FOR SAFELY STORING SECRETS IN SYSTEM MEMORY

BACKGROUND

1. Field

The present disclosure pertains to the field of information processing, and more specifically, to security in information processing systems.

2. Description of Related Art

Passwords, private or confidential information, and other secrets are used by and stored in many information processing systems. Therefore, many techniques have been developed to attempt to store secrets in a system memory of an information processing system such that they cannot be discovered or altered. However, many of these techniques may be vulnerable to cold-boot or hardware-based attacks. For example, an attacker having physical access to a system may isolate or remove system memory chips from the rest of the system to circumvent the protections provided by a memory controller, a chipset, software running on a processor, or any other system components, and then directly read out their contents to discover passwords, keys, protected content, and other secret information stored in them.

Even if the value of the secret is hashed before being stored in the system memory, the system may still be vulnerable to attack. For example, a hashed value of a system login password, instead of the system login password itself, may be stored in a system memory. Then, a login password input by a user may be hashed and compared to the hashed value stored in the system memory before allowing the user to access the system. In this situation, although an attacker cannot read the login password from the system memory, if he is able to read the hashed value, he may be able to use a dictionary attack or other approach on a different system to obtain a value that, when hashed, results in a match that allows him to gain access to the system.

BRIEF DESCRIPTION OF THE FIGURES

The present invention is illustrated by way of example and not limitation in the accompanying figures.

DETAILED DESCRIPTION

Embodiments of an invention for methods, apparatus, and instructions for safely storing secrets in system memory are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims, and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of location in a register, table, database, or other data or storage structure, whether implemented in hardware or software, but are not meant to limit embodiments of the invention to any particular type of location or number of bits or other elements within any particular location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention. The terms "zero" or "0" and "one" or "1" may be used to describe the values of binary digits ("bits") of data or other information, where the former may be any voltage or other level that represents a logical "zero" or "off" value, and the latter may be any such level that represents a logical "one" or "on" value.

As described in the background section, an information processing system might be vulnerable to hardware-based or other attacks to discover secrets stored in the system memory. Therefore, the use of embodiments of the present invention may be desired to mitigate the possibility of success of such attacks. Other uses of embodiments of the present invention are also possible, some of which may be described below.

Figure 1:
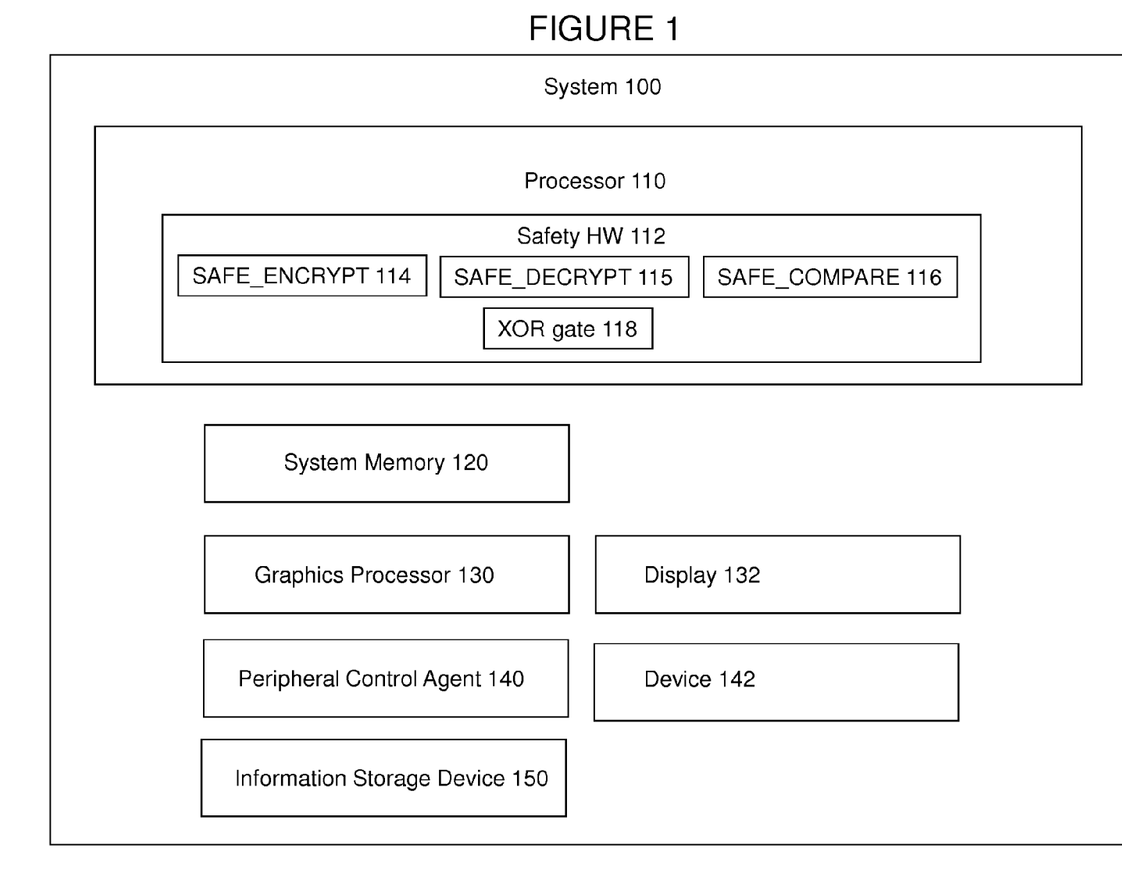
FIG. 1 illustrates a system including support for safely storing secrets in system memory according to an embodiment of the present invention.

FIG. 1 illustrates system 100, an information processing system for safely storing secrets in system memory according to an embodiment of the present invention. System 100 may represent any type of information processing system, such as a server, a desktop computer, a portable computer, a set-top box, a hand-held device such as a tablet or a smart phone, or an embedded control system. System 100 includes processor 110, system memory 120, graphics processor 130, peripheral control agent 140, and information storage device 150. Systems embodying the present invention may include any number of each of these components and any other components or other elements, such as peripherals and input/output devices. Any or all of the components or other elements in this or any system embodiment may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

System memory 120 may be dynamic random access memory or any other type of medium readable by processor 110. Graphics processor 130 may include any processor or other component for processing graphics data for display 132. Peripheral control agent 140 may represent any component, such as a chipset component, including or through which peripheral, input/output (I/O), or other components or devices, such as device 142 (e.g., a touchscreen, keyboard, microphone, speaker, other audio device, camera, video or other media device, network adapter, motion or other sensor, receiver for global positioning or other information, etc.) and/or information storage device 150, may be connected or coupled to processor 110. Information storage device 150 may include any type of persistent or non-volatile memory or storage, such as a flash memory and/or a solid state, magnetic, or optical disk drive.

Processor 110 may represent one or more processors or processor cores integrated on a single substrate or packaged within a single package, each of which may include multiple threads and/or multiple execution cores, in any combination. Each processor represented as or in processor 110 may be any type of processor, including a general purpose microprocessor, such as a processor in the Intel® Core™ Processor Family or other processor family from Intel® Corporation or another company, or a special purpose processor or microcontroller. Processor 110 may be architected and designed to operate according to any instruction set architecture, with or without being controlled by microcode. Furthermore, processor 110 may represent any device or component in an information processing system in which an embodiment of the present invention may be implemented.

Support for storing secrets in system memory according to an embodiment of the present invention may be implemented in a processor, such as processor 110, using any combination of circuitry and/or logic embedded in hardware, microcode, firmware, and/or other structures arranged as described below or according to any other approach, and is represented in FIG. 1 as safety hardware and/or logic 112, which may include hardware and/or logic 114 to support a first instruction to encrypt information according to an embodiment of the present invention (SAFE_ENCRYPT) and/or hardware and/or logic 116 to support a second instruction to compare information according to an embodiment of the present invention (SAFE_COMPARE), each as described below. Processor 110 may also include hardware and/or logic 115 to support a third instruction to decrypt information according to an embodiment of the present invention (SAFE_DECRYPT), where the information has been encrypted with the SAFE_ENCRYPT instruction.

Figure 2:
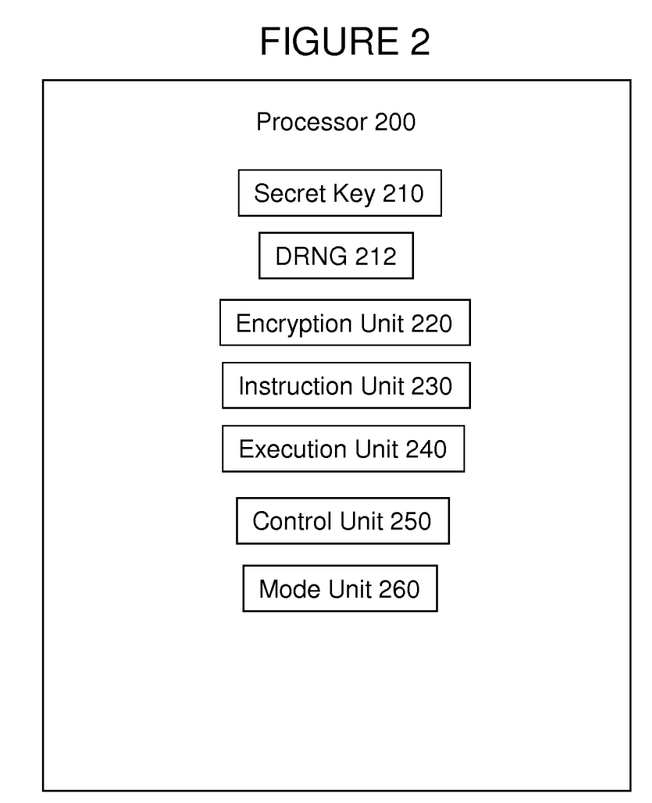
FIG. 2 illustrates a processor including support for safely storing secrets in system memory according to an embodiment of the present invention.

FIG. 2 illustrates processor 200, an embodiment of which may serve as processor 110 in system 100. Processor 200 includes secret key 210, random number generator 212, encryption unit 220, instruction unit 230, execution unit 240, control unit 250, and mode unit 260. Processor 200 may also include any other circuitry, structures, or logic not shown in FIG. 2. The functionality of safety hardware and/or logic 112, as introduced above and further described below, may be contained in or distributed among any of the labeled units or elsewhere in processor 200. Furthermore, the functionality and or circuitry of each of the described and/or illustrated units of processor 200 may be combined and/or distributed in any manner; for example, encryption unit 220 may share circuitry with and/or be fully or partially contained within execution unit 240.

Secret key 210 may represent any hardware key or other value embedded into processor 200 that may be used as a key in any cryptographic algorithm. The size of secret key 210 may be any number of bits (e.g., 32, 256, etc.). In an embodiment, the value of secret key 210 may be embedded, programmed, or otherwise stored in a read-only memory during or after manufacturing of processor 200, for example, using conductive tie-ups or tie-downs or fuses. Secret key 210 may be unique per processor core, processor IC, or processor package, or may be shared with other cores, ICs, or packages; for example, all ICs fabricated from the same mask set or design may have a secret key with the same value. In an embodiment, at least two processor cores, processor ICs, processor packages, other components or agents, or information processing systems may use the same value of secret key 210, such that the value of secret key 210 or a value derived from secret key 210 may not be used as a unique identifier (e.g., of a processor or a system).

In an embodiment, secret key 210 (e.g., the read-only memory in which it is stored) is inaccessible to software or firmware running on processor 200 or any other processor or other agent in system 100, in other words, secret key 210 is protected from being read by software or firmware. In an embodiment, secret key 210 may be hardwired to encryption unit 220 such that only the hardware in encryption unit 220 has access to secret key 210, and/or more specifically, is only available, readable, or otherwise accessible as needed for the execution of a SAFE_ENCRYPT instruction and/or SAFE_DECRYPT instruction. Neither the value of the key nor its use for the SAFE/ENCRYPT and/or SAFE_DECRYPT instructions are observable by any software or any other hardware.

Random number generator 212 may include any circuitry, structure, or other hardware to generate random numbers or pseudo-random numbers according to any known technique. In an embodiment, random number generator 212 is a digital random number generator (DRNG) within processor 200.

Encryption unit 220 may include any circuitry, structures, and/or other hardware to execute one or more cryptographic algorithms for encrypting and/or decrypting information according to any known technique. For example, encryption unit 220 may use secret key 210 to transform unencrypted information (plaintext) into encrypted information (ciphertext) that generally has no meaning unless subsequently decrypted by a reverse transformation. In an embodiment, encryption unit 220 includes circuitry to perform advanced encryption standard (AES) encryption.

Instruction unit 230 may include any circuitry, structures, and/or other hardware, such as an instruction decoder, to fetch, receive, decode, interpret, schedule and/or otherwise handle instructions to be executed by processor 200. Any instruction format may be used within the scope of the present invention; for example, an instruction may include an opcode and one or more operands, where the opcode may be decoded into one or more micro-instructions or micro-operations for execution by execution unit 240. Operands or other parameters may be associated with an instruction implicitly, directly, indirectly, or according to any other approach.

In an embodiment, instruction unit 230 may be designed to receive a SAFE_ENCRYPT instruction, the execution of which by processor 200 is described below. In an embodiment, instruction unit 230 may be designed to receive a SAFE_ENCRYPT instruction and a SAFE_COMPARE instruction the execution of each of which by processor 200 is described below. In an embodiment, instruction unit 230 may be designed to receive a SAFE_DECRYPT instruction, the execution of which by processor 200 is described below. Note that the names of these instructions are provided merely for convenience, and embodiments of the present invention may include instructions having any names desired. Note that various embodiments of the present invention are described and more may be possible, including various differences in the inputs to and the response of a processor executing a SAFE_ENCRYPT instruction. Embodiments of the present invention may include any one or more of these variations (e.g., a processor may support a SAFE_ENCRYPT instruction as described below in the description of FIG. 4 and/or a SAFE_ENCRYPT instruction as described below in the description of FIG. 5). In various embodiments, different instructions may be used for each different variety of a SAFE_ENCRYPT instruction, or they may be leaves of the same instruction (as may also be the case for a SAFE_ENCRYPT, a SAFE_DECRYPT, and/or a SAFE_COMPARE instruction).

Execution unit 240 may include any circuitry, structures, and/or other hardware, such as an arithmetic unit, logic unit, floating point unit, shifter, etc., for processing data and executing instructions, micro-instructions, and/or micro-operations.

Control unit 250 may include any circuitry, logic, or other structures, including microcode, state machine logic, and programmable logic, to control the operation of the units and other elements of processor 200 and the transfer of data within, into, and out of processor 200. Control unit 250 may cause processor 200 to perform or participate in the performance of method embodiments of the present invention, such as the method embodiments described below, for example, by causing processor 200, using execution unit 240, encryption unit 220, and/or any other resources, to execute instructions received by instruction unit 230 and micro-instructions or micro-operations derived from instructions received by instruction unit 230. In an embodiment, control unit 250 may provide the only access to secret key 210 by generating control signals that allow only encryption unit 220 to use secret key 210 only in response to a SAFE_ENCRYPT and/or SAFE_DECRYPT instruction, thereby protecting secret key 210 from access by any other hardware or software or in connection with any other instruction.

Mode unit 260 may include any circuitry, structures, and/or other hardware to support multiple modes of operation or privilege levels of processor 200. For example, mode unit 260 may include and/or access one or more status, control, configuration, or other bits, flags, fields, or other parts of a register, storage structure, or data structure to be used to indicate a mode of operation, a privilege level, and/or any other state of multiple states in which processor 200 may operate. In an embodiment, the mode, privilege level, and/or state of processor 200 may determine whether the SAFE_ENCRYPT instruction, SAFE_DECRYPT instruction, and/or the SAFE_COMPARE instruction is executable by processor 200. For example, mode unit 260 may support multiple privilege levels, including a highest (e.g., ring 0) privilege level intended for use by only the most privileged system software (e.g., operating system kernel), and the SAFE_ENCRYPT instruction, the SAFE_DECRYPT instruction, and the SAFE_COMPARE instruction may be executed only when processor 200 is operating at the highest privilege level.

Figure 3:
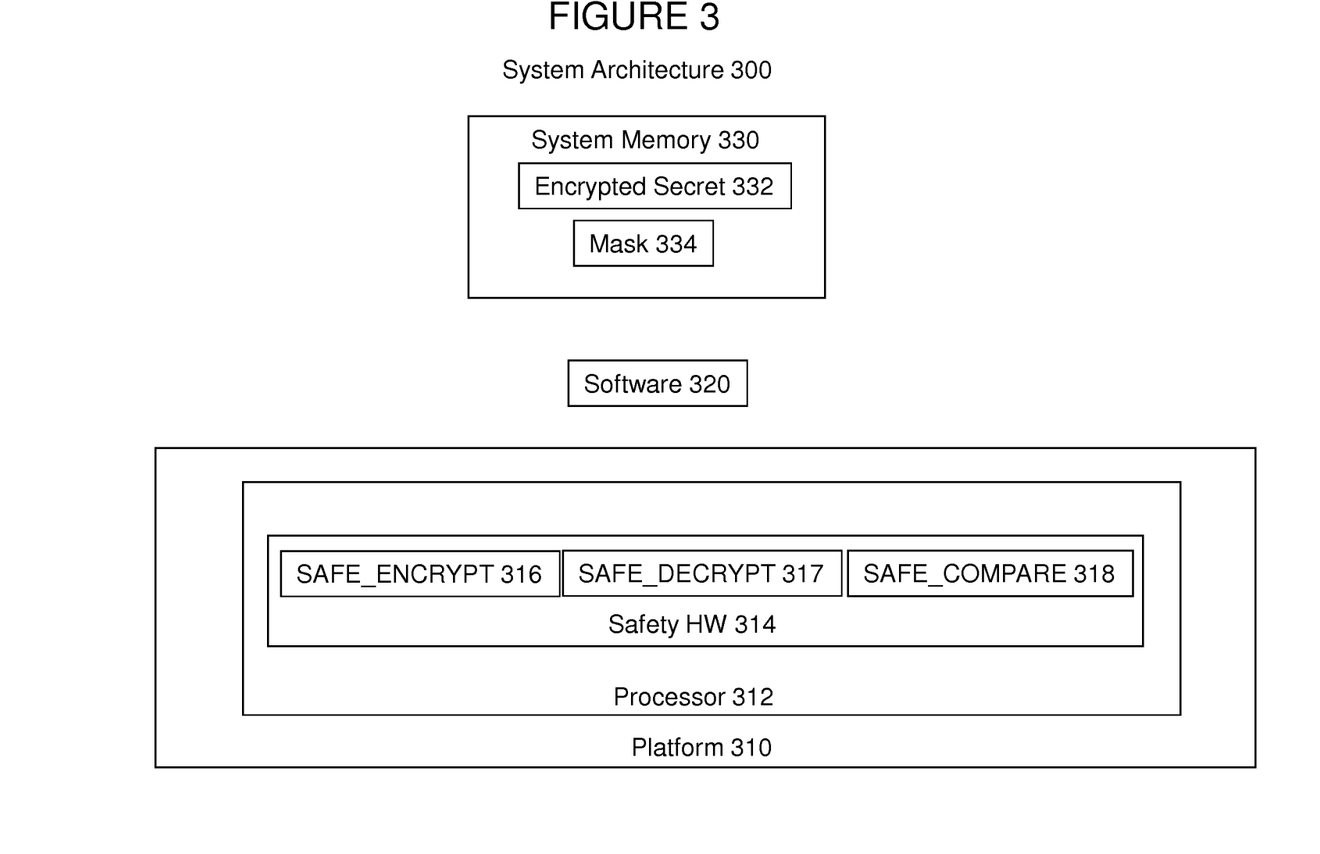
FIG. 3 illustrates a system architecture including software for safely storing secrets in system memory according to an embodiment of the present invention.

FIG. 3 illustrates system architecture 300 including software 320 for safely storing secrets in system memory 330 according to an embodiment of the present invention. System architecture 300 includes platform 310, processor 312, safety logic 314, SAFE_ENCRYPT logic 316, SAFE_DECRYPT logic 317, and SAFE_COMPARE logic 318. Platform 310 may represent the hardware of an information processing system such as system 100. Processor 312 may represent a processor according to an embodiment of the present invention, such as processor 110. Safety logic 314 may represent a safety unit according to an embodiment of the present invention, such as safety logic 112. SAFE_ENCRYPT logic 316 may represent support for a SAFE_ENCRYPT instruction according to an embodiment of the present invention, such as SAFE_ENCRYPT logic 114. SAFE_DECRYPT logic 317 may represent support for a SAFE_DECRYPT instruction according to an embodiment of the present invention, such as SAFE_DECRYPT logic 115. SAFE_COMPARE logic 318 may represent support for a SAFE_COMPARE instruction according to an embodiment of the present invention, such as SAFE_COMPARE logic 116.

Software 320 may represent any program, procedure, function, routine, module, or other group of code or instructions running or installed to run within system architecture 300. In an embodiment, software 320 may represent a system login program providing for a first user of platform 310 to set a login password, and also providing for the first or a second user to attempt to enter that login password in order to be able to use platform 310. Therefore, platform 310 may be protected from unauthorized use according to an embodiment of the present invention. In this embodiment, the login password is a secret to be safely stored in system memory. More specifically, a value derived from the login password may be stored in system memory to protect secrecy of the login password. In other embodiment, the value to be stored in system memory may be derived from any value intended to be secret, such as but not limited to a password, a key, a code to access a network or protected content, etc.

System memory 330 may be dynamic random access memory or any other type of medium readable by processor 312. System memory 330 includes any number of locations, each of any size, in which a value or other information may be stored. One such location is shown as memory location 332, in which in an embodiment of the present invention an encrypted value derived from a secret value, using a SAFE_ENCRYPT instruction, may be stored. Another such location is shown as memory location 334, in which in an embodiment of the present invention a mask value used by a SAFE_ENCRYPT instruction may be stored.

Figure 4:
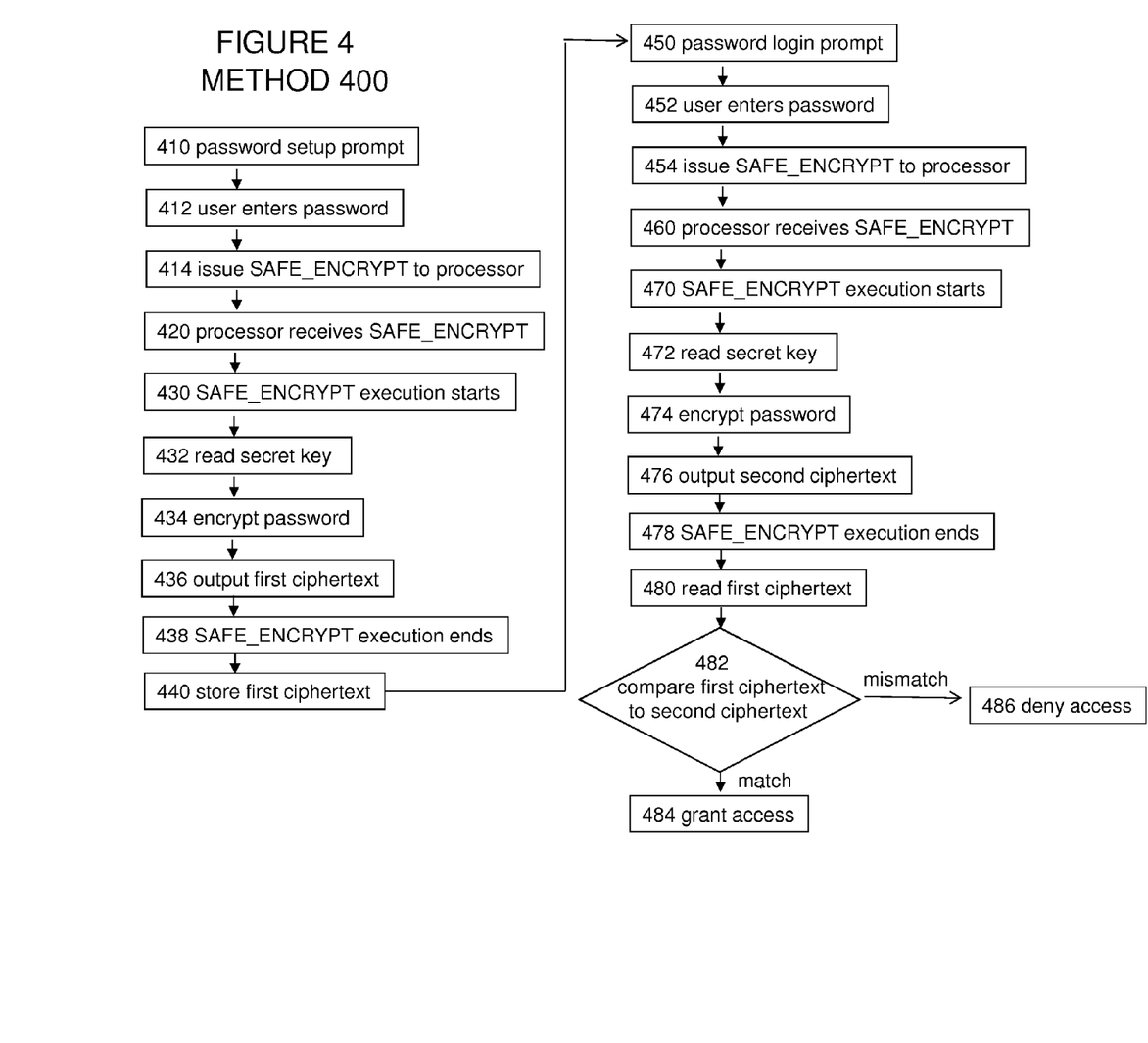
FIGS. 4 and 5 illustrate methods for safely storing secrets in system memory according to embodiments of the present invention.
Figure 5:
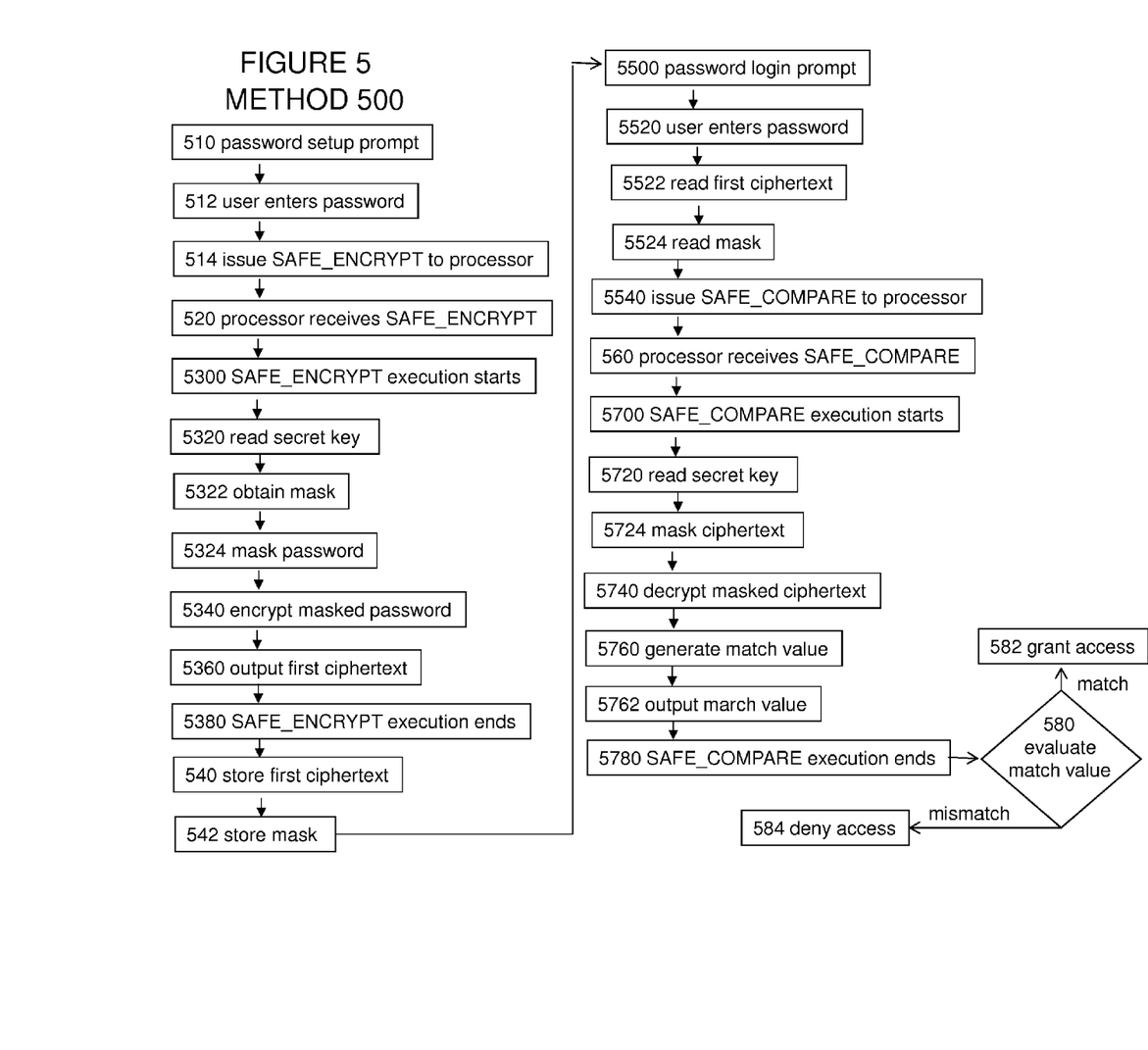

FIGS. 4 and 5 illustrate methods 400 and 500 for safely storing secrets in system memory according to an embodiment of the present invention. Although method embodiments of the invention are not limited in this respect, reference may be made to elements of FIGS. 1, 2, and 3 in the descriptions of the method embodiments of FIGS. 4 and 5. Various portions of methods 400 and 500 may be performed by hardware (e.g., instruction unit 230, control unit 250, execution unit 240, and/or encryption unit 220), software (e.g., a program or other code including instances of the SAFE_ENCRYPT, SAFE_DECRYPT, and/or SAFE_COMPARE instructions), a user of an information processing system, and/or a combination of hardware, firmware, software, and/or users.

In box 410 of method 400, software (e.g., a login program operating at a highest privilege level) prompts a user of an information processing system (e.g., system 100) for a value to be protected as a secret (e.g., a plaintext string or value to be used as login password). In box 412, the user enters a first plaintext input value (e.g., a desired login password). In box

414, a SAFE_ENCRYPT instruction in the software is presented, submitted, or delivered for execution by a processor (e.g., processor 200) in the system, the SAFE_ENCRYPT instruction having associated with it, as an operand or otherwise, the first plaintext input value (e.g., the SAFE_ENCRYPT instruction is to use the plaintext as an input value).

In box 420, instruction unit 230 receives the SAFE_ENCRYPT instruction. In box 430, in response to instruction unit 230 receiving the SAFE_ENCRYPT instruction, execution of the SAFE_ENCRYPT instruction by processor 200 begins. In box 432, secret key 210 is read by, routed to, or otherwise made accessible by or available to encryption unit 220. In box 434, the input to the SAFE_ENCRYPT instruction (e.g., the first plaintext input value) is encrypted by encryption unit 220, using secret key 210, to generate a first ciphertext output value. In box 436, the first ciphertext output value becomes readable by or otherwise accessible to the software. In box 438, execution of the SAFE_ENCRYPT instruction is complete.

Note that boxes 430 to 438 are performed by processor 200 in response to a single instruction (e.g., control unit 250, execution unit 240, and encryption unit 220 include hardware and logic to cause processor 200 to perform boxes 430 to 438 in response to the SAFE_ENCRYPT instruction). Note also that the key used to encrypt the plaintext is not presented by, known by, or available to the software containing the SAFE_ENCRYPT instruction (or any other software); only the hardware used for the encryption within processor 200 has access to the key.

In box 440, the software stores (e.g., using instructions other than SAFE_ENCRYPT and SAFE_COMPARE) the first ciphertext output value in a desired location in system memory (e.g., memory location 332).

In box 450, the software (e.g., the login program operating at a highest privilege level) prompts a user (who may be the same or different than the user in box 410) of the information processing system (e.g., system 100) for a secret value (e.g., login password). In box 452, the user enters a second plaintext input value (e.g., a potential login password). In box 454, a SAFE_ENCRYPT instruction in the software is presented, submitted, or delivered for execution by a processor (e.g., processor 200) in the system, the SAFE_ENCRYPT instruction having associated with it, as an operand or otherwise, the second plaintext input value (e.g., the SAFE_ENCRYPT instruction is to use the plaintext as an input value).

In box 460, instruction unit 230 receives the SAFE_ENCRYPT instruction. In box 470, in response to instruction unit 230 receiving the SAFE_ENCRYPT instruction, execution of the SAFE_ENCRYPT instruction by processor 200 begins. In box 472, secret key 210 is read by, routed to, or otherwise made accessible by or available to encryption unit 220. In box 474, the input to the SAFE_ENCRYPT instruction (e.g., the second plaintext input value) is encrypted by encryption unit 220, using secret key 210, to generate a second ciphertext output value. In box 476, the second ciphertext output value becomes readable by or otherwise accessible to the software. In box 478, execution of the SAFE_ENCRYPT instruction is complete.

Note that boxes 470 to 478 are performed by processor 200 in response to a single instruction (e.g., control unit 250, execution unit 240, and encryption unit 220 include hardware and logic to cause processor 200 to perform boxes 470 to 478 in response to the SAFE_ENCRYPT instruction). Note also that the key used to encrypt the plaintext is not presented by, known by, or available to the software containing the SAFE_ENCRYPT instruction (or any other software); only the hardware used for the encryption within processor 200 has access to the key.

In box 480, the software reads (e.g., using instructions other than SAFE_ENCRYPT and SAFE_COMPARE) the first ciphertext output value from the location from which it was stored in system memory (e.g., memory location 332). In box 482, the software compares (e.g., using instructions other than SAFE_ENCRYPT and SAFE_COMPARE) the first ciphertext output value to the second ciphertext output value. If they match, method 400 continues to box 484, in which the system becomes (e.g., as a result of the login program enabling or disabling a configuration setting) accessible to the user. If they do not match, method 400 continues to box 486, in which the system becomes (e.g., as a result of the login program enabling or disabling a configuration setting) or remains inaccessible to the user.

Note that even if a potential attacker is able to read the contents of the system memory, including the first ciphertext output value, neither the plaintext input password nor the secret key is stored in system memory, so the attacker cannot gain access to the system.

Turning to FIG. 5, in box 510 of method 500, software (e.g., a login program operating at a highest privilege level) prompts a user of an information processing system (e.g., system 100) for a value to be protected as a secret (e.g., a plaintext string or value to be used as login password). In box 512, the user enters a first plaintext input value (e.g., a desired login password). In box 514, a SAFE_ENCRYPT instruction in the software is presented, submitted, or delivered for execution by a processor (e.g., processor 200) in the system, the SAFE_ENCRYPT instruction having associated with it, as an operand or otherwise, the first plaintext input value (e.g., the SAFE_ENCRYPT instruction is to use the plaintext as an input value).

In box 520, instruction unit 230 receives the SAFE_ENCRYPT instruction. In box 5300, in response to instruction unit 230 receiving the SAFE_ENCRYPT instruction, execution of the SAFE_ENCRYPT instruction by processor 200 begins. In box 5320, secret key 210 is read by, routed to, or otherwise made accessible by or available to encryption unit 220. In box 5322, a mask value is obtained (e.g., from the output of a random number generator such as DRNG 212). In box 5324, a first masked input value is generated (e.g., by an exclusive-OR (XOR) operation on the first plaintext input value and the mask value, using XOR gate 118 in safety logic 112).

In box 5340, the first masked input value is encrypted by encryption unit 220, using secret key 210, to generate a first ciphertext output value. In box 5360, the first ciphertext output value becomes readable by or otherwise accessible to the software. In box 5380, execution of the SAFE_ENCRYPT instruction is complete.

Note that boxes 5300 to 5380 are performed by processor 200 in response to a single instruction (e.g., control unit 250, execution unit 240, and encryption unit 220 include hardware and logic to cause processor 200 to perform boxes 5300 to 5380 in response to the SAFE_ENCRYPT instruction). Note also that the key used to encrypt the plaintext is not presented by, known by, or available to the software containing the SAFE_ENCRYPT instruction (or any other software); only the hardware used for the encryption within processor 200 has access to the key.

In box 540, the software stores (e.g., using instructions other than SAFE_ENCRYPT and SAFE_COMPARE) the first ciphertext output value in a desired location in system memory (e.g., memory location 332). In box 542, the software stores (e.g., using instructions other than SAFE_ENCRYPT and SAFE_COMPARE) the mask value in a desired location in system memory (e.g., memory location 334).

In box 5500, the software (e.g., the login program operating at a highest privilege level) prompts a user (who may be the same or different than the user in box 510) of the information processing system (e.g., system 100) for a secret value (e.g., login password). In box 5520, the user enters a second plaintext input value (e.g., a potential login password). In box 5522, the software reads (e.g., using instructions other than SAFE_ENCRYPT and SAFE_COMPARE) the first ciphertext output value from the location from which it was stored in system memory (e.g., memory location 332). In box 5524, the software reads (e.g., using instructions other than SAFE_ENCRYPT and SAFE_COMPARE) the mask value from the location from which it was stored in system memory (e.g., memory location 334).

In box 5540, a SAFE_COMPARE instruction in the software is presented, submitted, or delivered for execution by a processor (e.g., processor 200) in the system, the SAFE_COMPARE instruction having associated with it, as operands or otherwise, the second plaintext input value, the first ciphertext output value, and the mask value (e.g., the SAFE_COMPARE instruction is to use the plaintext, the ciphertext, and the mask as input values).

In box 560, instruction unit 230 receives the SAFE_COMPARE instruction. In box 5700, in response to instruction unit 230 receiving the SAFE_COMPARE instruction, execution of the SAFE_COMPARE instruction by processor 200 begins. In box 5720, secret key 210 is read by, routed to, or otherwise made accessible by or available to encryption unit 220. In box 5724, a second masked input value is generated (e.g., by an exclusive-OR (XOR) operation on the first ciphertext output value and the mask value, using XOR gate 118 in safety logic 112).

In box 5740, the second masked input value is decrypted by encryption unit 220, using secret key 210, to generate a first plaintext output value. In box 5760, the first plaintext output value is compared to the second plaintext input value. In box 5762, the result of the comparison becomes readable by or otherwise accessible to the software, for example as a match value of '1' if a match is detected and a '0' if not. In box 5780, execution of the SAFE_COMPARE instruction is complete.

Note that boxes 5700 to 5780 are performed by processor 200 in response to a single instruction (e.g., control unit 250, execution unit 240, and encryption unit 220 include hardware and logic to cause processor 200 to perform boxes 5700 to 5780 in response to the SAFE_COMPARE instruction). Note also that the key used to decrypt the ciphertext is not presented by, known by, or available to the software containing the SAFE_COMPARE instruction (or any other software); only the hardware used for the decryption within processor 200 has access to the key.

In box 580, the software evaluates the match value. If it indicates a match (e.g., is a '1'), method 500 continues to box 582, in which the system becomes (e.g., as a result of the login program enabling or disabling a configuration setting) accessible to the user. If it does not indicate a match (e.g., is a '0'), method 500 continues to box 584, in which the system becomes (e.g., as a result of the login program enabling or disabling a configuration setting) or remains inaccessible to the user.

Note that even if a potential attacker is able to read the contents of the system memory, including the first ciphertext output value and the mask value, neither the plaintext input password nor the secret key is stored in system memory, so the attacker cannot gain access to the system.

In various embodiments of the present invention, the methods illustrated in FIGS. 4 and 5 may be performed in a different order, with illustrated boxes combined or omitted, with additional boxes, or with a combination of reordered, combined, omitted, or additional boxes. Furthermore, method embodiments of the present invention are not limited to methods 400 and 500 or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, software or firmware instructions stored on a medium readable by processor 200, which when executed by processor 200 may cause processor 200 to execute an embodiment of the present invention. Also, aspects of the present invention may be embodied in data stored on a machine-readable medium, where the data represents a design or other information usable to fabricate all or part of processor 200.

Thus, embodiments of an invention for methods, apparatus, and instructions for safely storing secrets in system memory have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
   a hardware key;
   an instruction unit to receive an encryption instruction and a compare instruction, the encryption instruction having a first plaintext input value and the compare instruction having a second plaintext input value; and
   an encryption unit to, in response to the encryption instruction, encrypt the first plaintext input value using the hardware key to generate a ciphertext value, and, in response to the compare instruction, decrypt the ciphertext value using the hardware key to generate a plaintext output value and compare the plaintext output value to the second plaintext input value.

2. The processor of claim 1, further comprising an exclusive-OR gate to, in response to the encryption instruction, mask the first plaintext input with a mask value prior to encryption.

3. The processor of claim 2, wherein the exclusive-OR gate is also to, in response to the compare instruction, mask the ciphertext value with the mask value prior to decryption.

4. The processor of claim 2, further comprising a random number generator to generate the mask value.

5. The processor of claim 1, further comprising a mode unit to allow execution of the encrypt instruction and the compare instruction only at a highest privilege level.

6. A method comprising:
issuing, by a login program to a processor, an encryption instruction having a first plaintext password as an input value;
executing, by the processor, the encryption instruction, wherein execution of the encryption instruction includes encrypting the first plaintext password using a hardware key accessible only to encryption hardware within the processor to generate first ciphertext;
storing, by the login program, the first ciphertext in a system memory
reading, by the login program, the first ciphertext from the system memory; and
issuing, by the login program to the processor, a compare instruction having a second plaintext password as a first input value and the first ciphertext as a second input value.

7. The method of claim 6, further comprising:
issuing, by the login program to the processor, the encryption instruction having a second plaintext password as the input value;
executing, by the processor, the encryption instruction, wherein execution of the encryption instruction includes encrypting the second plaintext password using the hardware key to generate second ciphertext;
reading the first ciphertext from the system memory;
comparing the first ciphertext to the second ciphertext; and
granting access to a system if the first ciphertext matches the second ciphertext.

8. The method of claim 6, wherein execution of the encryption instruction also includes masking the first plaintext password with a mask value prior to encryption.

9. The method of claim 8, wherein execution of the encryption instruction also includes obtaining the mask value from a random number generator.

10. The method of claim 6, further comprising executing, by the processor, the compare instruction, wherein execution of the compare instruction includes decrypting the first ciphertext to generate a plaintext output and comparing the plaintext output to the second plaintext password to generate a match value.

11. The method of claim 10, further comprising granting access to a system if the match value indicates that the plaintext output matches the second plaintext password.

12. The method of claim 8, further comprising storing the mask value in the system memory.

13. The method of claim 12, further comprising:
reading, by the login program, the first ciphertext from the system memory;
reading, by the login program, the mask value from the system memory; and
issuing, by the login program to the processor, a compare instruction having a second plaintext password as a first input value, the first ciphertext as a second input value, and the mask value as a third input value.

14. The method of claim 13, further comprising executing, by the processor, the compare instruction, wherein execution of the compare instruction includes masking the first ciphertext with the mask value, decrypting the masked first ciphertext to generate a plaintext output, and comparing the plaintext output to the second plaintext password to generate a match value.

15. The method of claim 14, further comprising granting access to a system if the match value indicates that the plaintext output matches the second plaintext password.

16. A system comprising:
a processor including
a hardware key;
an instruction unit to receive an encryption instruction and a compare instruction, the encryption instruction having a first plaintext input value and the compare instruction having a second plaintext input value; and
an encryption unit to, in response to the encryption instruction, encrypt the first plaintext input value using the hardware key to generate a ciphertext value, and, in response to the compare instruction, decrypt the ciphertext value using the hardware key to generate a plaintext output value and compare the plaintext output value to the second plaintext input value; and
a system memory in which to store the ciphertext value.

17. The system of claim 16, wherein the processor also comprises an exclusive-OR gate to, in response to the encryption instruction, mask the first plaintext input with a mask value prior to encryption.

18. The system of claim 17, wherein the memory is also in which to store the mask value.

19. The system of claim 18, wherein the exclusive-OR gate is also to, in response to the compare instruction, mask the ciphertext value with the mask value prior to decryption.

* * * * *